United States Patent [19]

Metz

[11] Patent Number: 5,412,188

[45] Date of Patent: May 2, 1995

[54] SPORTS STATISTIC RECORDING SYSTEM

[76] Inventor: Philip D. Metz, 47 Alten Ave., NE., Grand Rapids, Mich. 49503

[21] Appl. No.: 86,243

[22] Filed: Jul. 1, 1993

[51] Int. Cl.⁶ .............................................. G06F 15/44
[52] U.S. Cl. .................... 235/375; 273/438; 364/411
[58] Field of Search ................ 235/375, 380, 462; 364/410, 411; 273/438, 1.5 R

[56] References Cited

U.S. PATENT DOCUMENTS 4,608,487  8/1986  Awane et al. ................. 235/462 X
5,018,736  5/1991  Pearson et al. ............... 364/410 X
5,026,058  6/1991  Bromley ........................ 273/93 C
5,159,180  10/1992 Feiler ............................ 235/375
5,319,548  6/1994  Germain ....................... 364/410

Primary Examiner—Davis L. Willis
Assistant Examiner—Edward H. Sikorski
Attorney, Agent, or Firm—Warner, Norcross & Judd

[57] ABSTRACT

A sports statistic recording system includes charts containing barcodes, a scanning device, and a personal computer. The computer is programmed to associate specific barcodes with specific players and game events. As events occur during a sporting match, the scanning device is used to scan the barcodes associated with the player and the event involved for rapid and simple data input. The scanned information is conveyed to the computer, which stores the information and compiles it for convenient reference.

2 Claims, 4 Drawing Sheets

SPORTS STATISTIC RECORDING SYSTEM

BACKGROUND OF THE INVENTION

The present invention relates to recording and compiling statistics from sporting events, and more particularly to a system for recording sports statistics contemporaneously with the occurrence of the events being recorded.

At all levels of sporting competition, statistics commonly are kept which reflect the performance of a team and/or individual performers. Statistics taken from a single game or match have many possible applications, such as keeping a continuously updated account of a player's performance over the course of an athletic season. Statistics typically reflect which player did what in terms of scoring, defense, mistakes, penalties, and the like.

In addition to statistics, ideally records are kept of how and from where a player made a play reflected in the player's statistics, since this better memorializes the events of the game being recorded. However, if the game events occur too quickly one after another, it is difficult to record all of the details which ideally would be recorded for each play. Due to time constraints, it is especially difficult to record a description of how or from where a player or team made a given play.

Various systems, both computerized and manual, for recording statistics are commonly used in different sports. For example, in a football game, typically two spotters watch each play and identify relevant statistical information, such as the name of the ball carrier and the yardage gained or lost. The spotters orally relay the information to a computer operator stationed at a computer terminal. The computer operator then manually inputs the information into the computer. In this manner, a record of each play of the game is generated. Although such a system is relatively slow, it is feasible in football because of the substantial time lapse between plays in a football game.

In other sports, however, such a system cannot be used because it is too slow. For example, in basketball, often there is no time lapse between plays, and recordable events often occur one immediately after another, such as a rebound after a missed shot. In basketball, recording of statistics is performed manually on paper. Manual recording in basketball takes two forms: a shot chart and a score sheet. A shot chart essentially is a map of the basketball court. The statistician makes a record of the approximate location of every shot, the identity of the player taking the shot, and the result of the shot, by making marks on a shot chart. With a score sheet, the statistician marks down non-shooting statistics as they occur.

Manual recording, however, is problematic in that it is too slow to allow for detailed recording of all events in a given sequence. For instance, a statistician might not have time to manually record all details of a sequence in which the home team's center misses a jump shot from just inside the free throw line and slightly to the left of the basket, whereafter the rebound is grabbed by one of the home team's forwards, who subsequently misses a layup, gets his own rebound and then makes a layup. Furthermore, even if manual recording were to result in successful recordation of all desired statistics and descriptions, the handmade record would be neither neat nor in a format convenient for a reader.

SUMMARY OF THE INVENTION

The aforementioned problems are overcome by the present invention wherein a barcoded, or other optically scannable, system is provided to record statistics and descriptions of plays. Scannable charts including possible information to be inputted are prepared prior to the game. A hand-held scanning device, such as a pen, is provided for selectively scanning the barcodes depending on sports actions and conveying the information embodied in the barcodes to the computer. When a given event occurs, the statistician uses the system to record the event by merely sweeping the pen over one or more barcodes which collectively describe the event. At any time, including during the course of a game, the information stored in the computer can be displayed or printed in a desired format.

In a preferred embodiment, scannable charts are provided for a basketball game. A roster chart contains barcodes corresponding to each player. A play chart contains barcodes corresponding to various possible plays, including different types of shots, successful and unsuccessful shots, steals, rebounds and the like. A third chart contains barcodes corresponding to various court locations. When a recordable event occurs, the statistician uses the pen first to scan the barcode corresponding to the player making the play, then to scan the barcode corresponding to the court location at which the play occurred, and then to scan the barcode corresponding to the event.

These and other features and advantages of the present invention will be further understood by reference to the Detailed Description of the Preferred Embodiment and the drawings.

DETAILED DESCRIPTION OF THE PREFERRED EMBODIMENT

Figure 1:
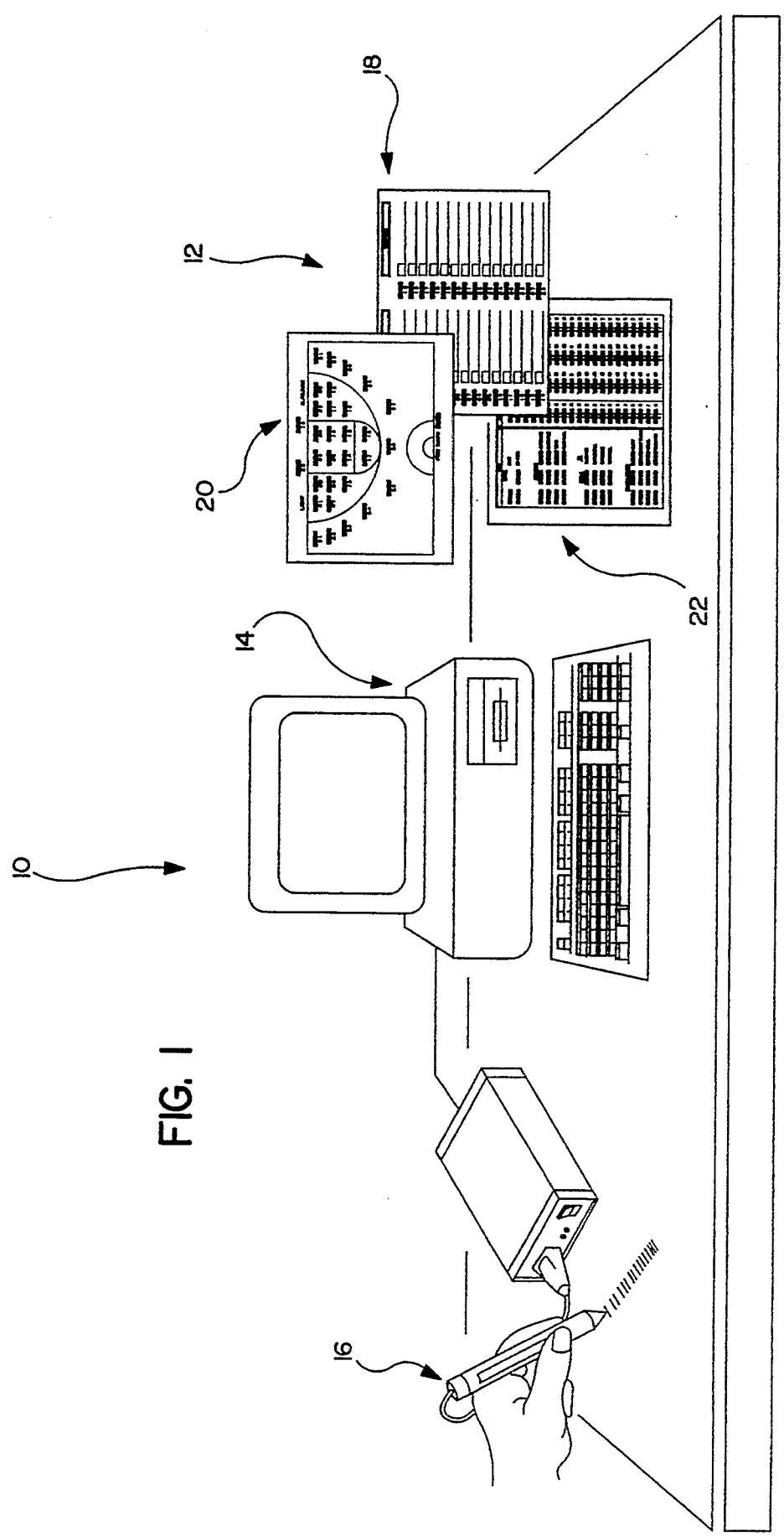
FIG. 1 is a perspective view of the system of the present invention, including a personal computer and three sheets optically scannable charts.

By way of disclosing a preferred embodiment, and not by way of limitation, there is shown in FIG. 1 the sports statistic recording system 10 of the present invention.

The system is comprised of three charts 12 containing barcodes, a personal computer 14, and a scanning pen 16. The three charts are the roster chart 18 of FIG. 2, the court chart 20 of FIG. 3, and the play chart 22 of FIG. 4. The personal computer 14 can be any one of a number of commercially available personal computers. The scanning pen is PC-compatible and Macintosh-compatible, such as the model sold under the name EZ Barcode by TimeKeeping Systems of Cleveland, Ohio.

Figure 2:
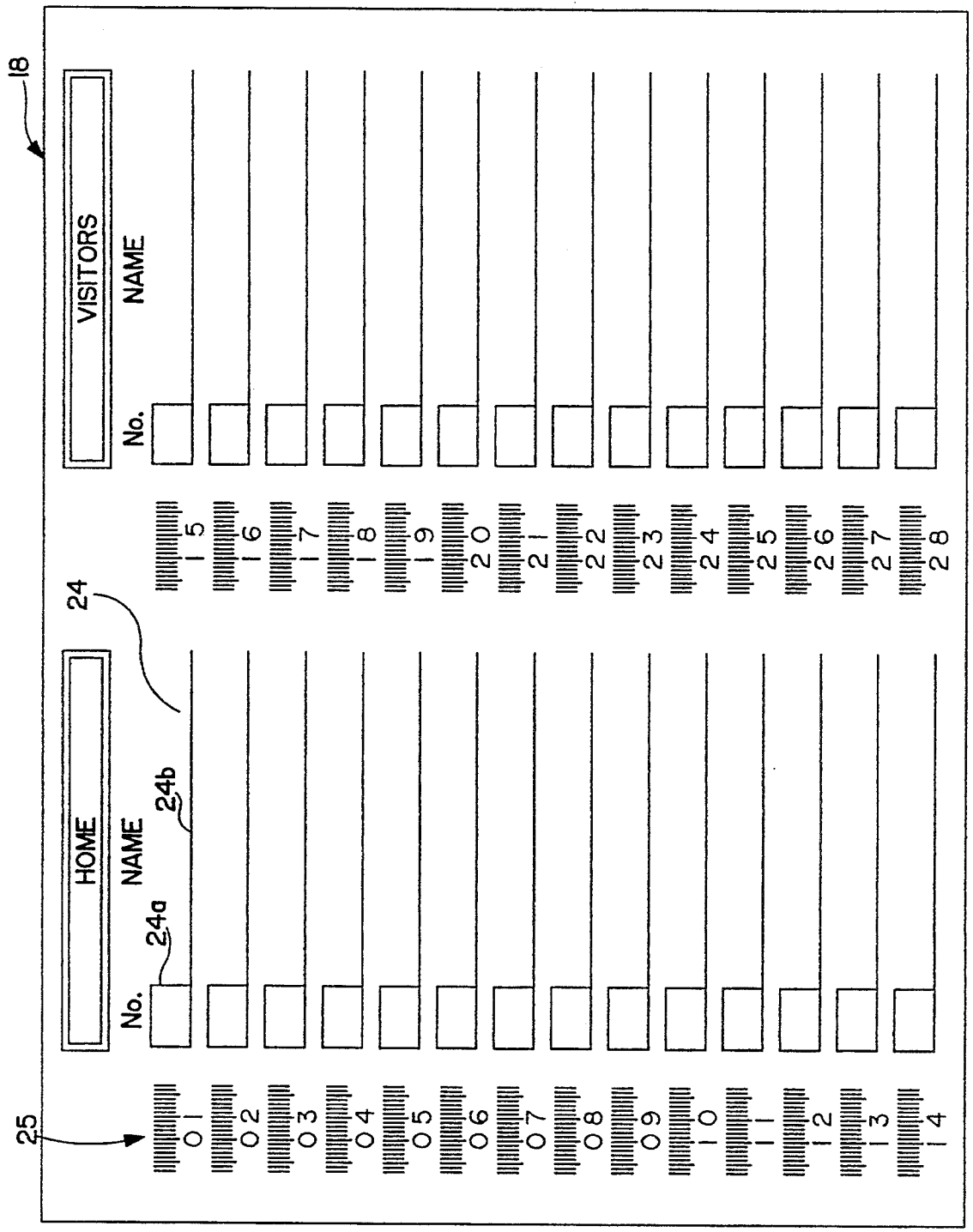
FIG. 2 is a sample roster chart containing barcodes which each correspond to a particular player.

Referring now to FIG. 2, the roster chart 18 initially contains a column of blank spaces 24 for each team playing in a game. Each blank 24 includes a box 24a and a line 24b for the player's number and name, respectively. For convenience, the blanks 24 are arranged into two columns for the home and visiting teams. Opposite each blank space 24 is a barcode 25. The barcode associated with each blank 24 is unique and different from the other barcodes on the charts 12. As used herein, the term "barcode" generally refers to a scannable optical marking and is not limited to material which is bar-like in appearance.

In preparation for a particular game, the statistician fills in the blank spaces 24 opposite each barcode 25 by inserting therein the name and number of each player on the home and visiting teams. In addition, the computer 14 is programmed with the players' names and numbers associated with each barcode 25. Every player barcode 25 will thereafter correspond to and represent the name of the player inserted opposite the barcode.

Figure 3:
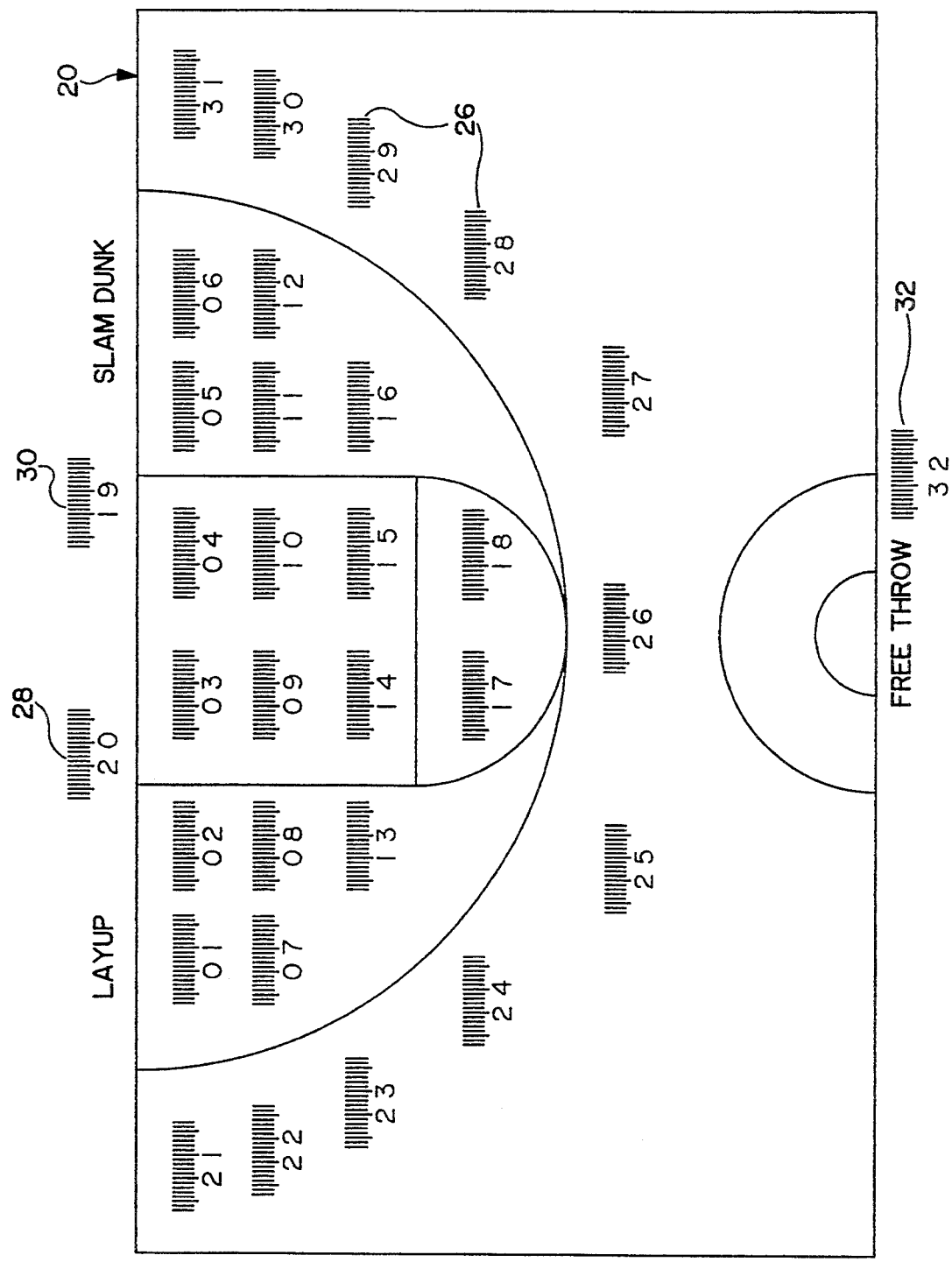
FIG. 3 is a sample play chart containing barcodes which each correspond to a particular type of play.

Referring now to FIG. 3, the court chart 20 essentially is a diagram of one-half of a basketball court. The court chart 20 contains barcodes 26 corresponding to various locations on the court. Additionally, there are barcodes for a layup 28, a slam dunk 30, and a free throw 32. Each barcode 25, 28, 30, and 32 is unique and different from the other barcodes on the charts 12. The computer is programmed to associate each barcode 26 with the associated floor location. Accordingly, a floor location can be inputted simply by scanning the associated barcode. As is known to basketball fans, layups, slam dunks and free throws all are specific types of shots, each of which in effect can be taken only from a single specific location.

Figure 4:
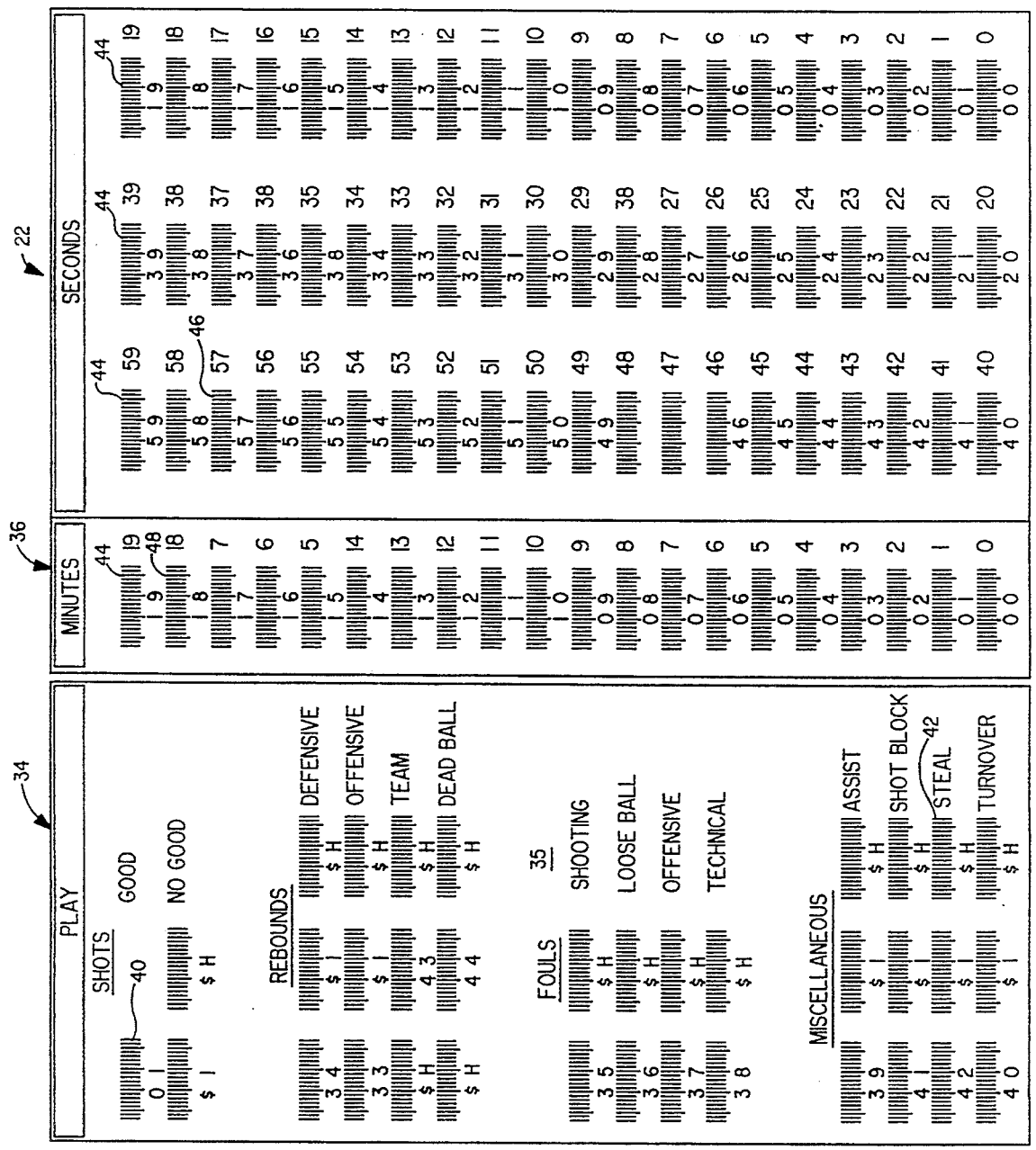
FIG. 4 is a sample court chart containing barcodes which each correspond to an approximate court location.

Referring now to FIG. 4, the play-and-time chart 22 contains a play chart 34 and a time chart 36. The play chart 34 includes a list 35 of recordable events which potentially can occur during the course of a basketball game. A barcode 40 is associated with each list item. Each barcode 40 is unique and different from the other barcodes on the charts 12. The computer is programmed with each barcode and associated list entry.

The time chart 36 contains barcodes 44 corresponding to every minute and every second of each half of a basketball game. Of course, the numbers on the time chart will vary depending on the type (e.g. professional, college, or high school) of game scored.

USE

Preferably, a spotter and computer operator work together to score a game. The spotter watches the action of the basketball game and dictates events to the computer operator. The operator then scans barcodes of the three charts 12 to enter the dictated data. For example, the operator first uses the roster chart 18 and uses the scanning pen to scan the barcode corresponding to the player making the play. In rare instances, however, an event will be recorded without reference to a particular player, as for instance when a team rebound occurs; in those instances, the statistician will not sweep a particular player's barcode.

Second, if the event being recorded is a shot, the operator uses the shot chart 20 and uses the scanning pen 16 to scan the barcode corresponding to the location of the shot.

Third, the operator uses the play chart 34 and sweeps the barcode corresponding to the play being recorded. For example, if a layup is made, the statistician sweeps the barcode 28 corresponding to "layup" and then sweeps the barcode 40 corresponding to "shot good." Alternatively, if for example a steal is made, the statistician ignores the shot chart 20 and directly consults the play chart 36 and sweeps the barcode 42 corresponding to "steal."

Finally, the operator optionally may record the time of the event by sweeping the appropriate barcode 46 corresponding to the number of minutes remaining in the half, and then scanning the appropriate barcode 48 corresponding to the number of seconds involved.

The information thus scanned is received by the personal computer 14, which is programmed in known fashion to receive the barcode information scanned by the scanning pen 16. The personal computer 14 is programmed to record all information in association with the remainder of the information from the same sequence. Furthermore, the computer is programmed to keep a continuous count of the number of times the barcode for a given play is scanned in association with each player. Thus, the system provides a continuously updated record of each player's statistics for the game.

The personal computer also may be programmed to download the information stored therein or to print it in some desirable format. For example, the computer 14 may be programmed to generate a shot chart based on the information received from the barcodes on the court chart 20. Alternatively, the computer 14 may be programmed to generate a box score showing each player's statistics for a game based on the information received from the barcodes on the play chart 34 and the roster chart 18.

The present invention is equally useful for other sports, especially those where action often proceeds rapidly without interruption. Of course, different charts will be required depending on the sporting event. The computer also would have to be programmed to record and maintain the appropriate statistics. As will be appreciated, the present system enables the simple, rapid, and accurate entry and recording of statistical information related to a sporting event. All data entry during play is made using optical scanning techniques, eliminating the relatively slow input of a conventional keyboard. The recorded data is therefore believed to have enhanced accuracy and reliability over prior techniques.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A method for recording and compiling statistical information at a basketball game comprising:
    providing roster bar code means including a plurality of bar codes each uniquely associated with a basketball player;
    providing location bar code means including a plurality of bar codes each uniquely associated with a location on a basketball court;
    providing play bar code means including a plurality of bar codes each uniquely associated with a play that may occur during a basketball game;
    scanning the bar codes on the bar code means rapidly during a basketball game to rapidly create inputted information; and
    receiving and compiling the inputted information using a computer to create statistical information related to the basketball game.

2. The method of claim 1 further comprising providing time bar code means including a plurality of bar codes each uniquely associated with an indication of time, and wherein said scanning step includes scanning the bar codes on the time bar code means.

* * * * *